Oct. 31, 1944. R. C. PRYOR 2,361,794
SEAL FOR SUBSURFACE PRESSURE GAUGES
Filed Jan. 22, 1943

INVENTOR.
R. C. PRYOR
BY *Hudson, Young & Yinger*
ATTORNEYS.

Patented Oct. 31, 1944

2,361,794

UNITED STATES PATENT OFFICE 2,361,794

SEAL FOR SUBSURFACE PRESSURE GAUGES

Robert C. Pryor, Bartlesville, Okla., assignor to Phillips Petroleum Company, a corporation of Delaware Application January 22, 1943, Serial No. 473,237

1 Claim. (Cl. 286—35)

This invention relates to a device for use in determining pressures in well bores and is especially adapted to obtaining a continuous record of the pressures encountered at various depths in wells. This application is a continuation-in-part of my copending application, Serial Number 344,155 filed July 5, 1940, abandoned January 27, 1943, in favor of the present application.

In recent years, the oil industry has come to a full realization of the importance of obtaining accurate data regarding bore holes and conditions therein. Among other things, it has been found that a proper knowledge of the pressures existing at different depths in a well bore may be extremely valuable. Pressures thus obtained may be correlated with information derived from a study of samples of formations traversed by the drilling tools, temperature determinations and other data regarding the bore hole to thereby ascertain the ability of particular formations to produce hydrocarbon fluids at various rates, estimate the probable ultimate hydrocarbon fluid recovery from different reservoirs, and determine the type of equipment best suited to operate individual wells in an efficient and economical manner.

Several instruments have been devised for obtaining subsurface pressures and it might be stated that in general, these devices have been employed with moderate success. Devices of this character, which are available at present to the industry, all have inherent limitations both in accuracy and in the pressures which they are adapted to withstand and accurately record. For example, conventional recording subsurface pressure gauges will not function satisfactorily if they are subjected to temperatures greater than 200° F. and pressures in excess of 3,000 pounds per square inch. This is due for the most part to faulty construction and design and the use of inadequate and improper sealing means. The present invention obviates the difficulties experienced heretofore and provides subsurface pressure recording apparatus which functions accurately and successfully under extreme conditions of temperature and pressure. It is not unusual in modern drilling operations to sink wells to depths ranging from 10,000 to 15,000 feet below the surface of the earth and encounter temperatures as high as 250° F. and pressures greater than 6,000 pounds per square inch. It is possible with the use of my invention to obtain accurate continuous records of pressure in these deep wells. In fact, my device has been successfully employed to properly record well pressures of over 10,000 pounds per square inch without damage to the device or inaccuracies in the data obtained; and it would merely involve minor changes in design to make my invention capable of being employed to record even greater pressures.

In its specific aspects, the instant invention includes a simple, compact and durable shell or housing which is adapted to withstand any impacts, temperatures and pressures that may be encountered while it is being lowered into or withdrawn from a well bore; a chamber within the housing having a sensitive pressure recording mechanism positioned therein; a piston cooperating with the pressure recording mechanism to transmit well fluid pressures thereto against the action of a compression spring; a split distortable cylindrical member for maintaining an adequate fluid seal between the piston and the recording mechanism chamber; and a valve controlled passageway through which fluid at predetermined pressure may be introduced into the recording chamber, the fluid thus admitted into the chamber opposing the well fluid pressure on the piston.

It is the primary object of this invention to provide a device for obtaining an accurate record of fluid pressures encountered at various depths in well bores.

Another object of this invention is to provide a subsurface recording pressure gauge in which the recording chamber is effectively sealed against the entrance of well fluids regardless of the pressures encountered in the well bore.

Another object of this invention is to provide a pressure gauge that is capable of accurately recording tremendous pressures existing in many deep well bores and that can successfully withstand elevated well temperatures, impacts and shocks without damage to the gauge or impairment to its sensitivity of operation.

An additional object is the provision of a stuffing box and distortable shaft packing means capable of withstanding high pressures while, at the same time, creating a minimum frictional resistance to relative movement of the shaft.

This invention has for a further object the provision of a device of the character indicated which may be readily lowered into and subsequently withdrawn from flow tubing of any size that is customarily employed in producing a well.

A still further object of this invention is to provide a subsurface recording pressure gauge that is simple in design, rugged in construction and relatively inexpensive to manufacture, operate and maintain.

The above enumerated objects, as well as additional objects and advantages will be readily apparent to those skilled in the art by referring to the following detailed description and annexed drawing which respectively describe and illustrate a preferred embodiment of the invention, and wherein Figure 1 is a central longitudinal cross section view of the upper portion of the invention;

Figure 1:
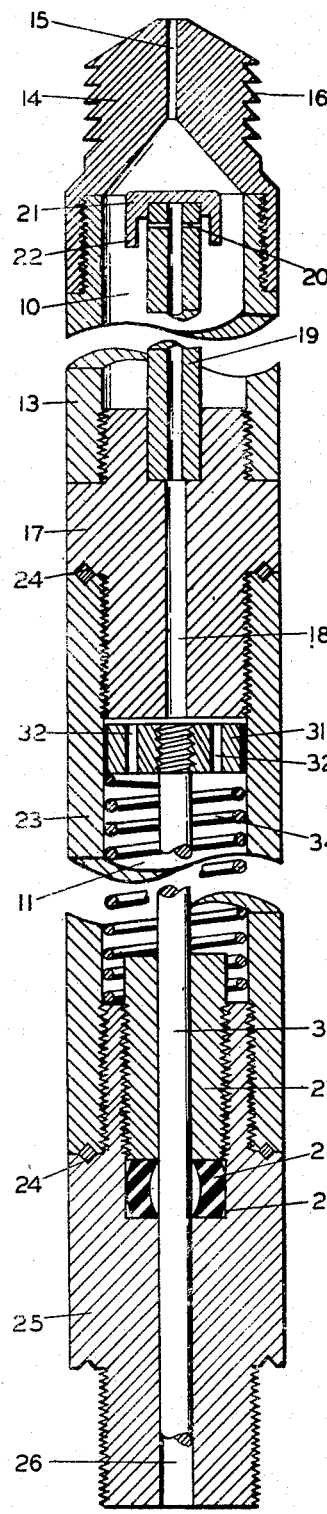
Figure 2:
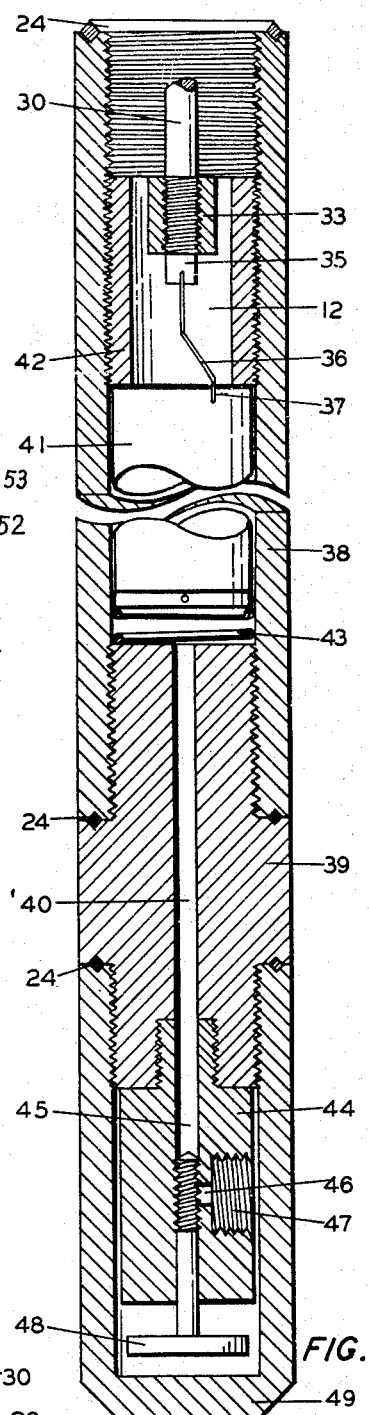
Figure 2 is a central longitudinal cross section view of the lower portion of the invention.

Referring to the drawing, and more particularly to Figures 1 and 2, I have denoted therein a housing having three chambers, namely, a fluid chamber 10, a spring chamber 11 and a recording chamber 12. The fluid chamber is formed by the interior of a tubular member 13 which has external threads on its upper portion to receive a combined cap and "fishing head" 14 having a bore 15 which serves as the fluid inlet. In addition, the bore 15 is adapted to receive a wire line or cable (not shown) by which my device is lowered into and withdrawn from a well bore. Suitable notches 16 are provided on the exterior periphery of the fishing head to facilitate recovery of the device in the event that it becomes lost or stuck in the well bore. The lower portion of tubular member 13 is internally threaded to engage the upper portion of a plug 17 which has a central passage 18 that communicates with a fluid conductor tube 19 having a plurality of radially extending ports 20 at its upper end. A cap or other suitable closure 21 is removably connected to the upper end of conductor tube 19 and is provided with an apron 22.

A tubular member 23, internally threaded at each end, constitutes the outer wall of spring chamber 11. A sealing ring 24, preferably composed of aluminum, is provided between plug 17 and tubular member 23 to obtain an effective fluid seal. It will be noted that similar joints in other portions of the apparatus are sealed in the same manner. A plug 25 having a central passage 26 is threadedly connected to the lower portion of tubular member 23 and embraces a retainer plug 27 which normally maintains a sealing member or packer 28 under compression within the stuffing box 28A.

Figure 3:
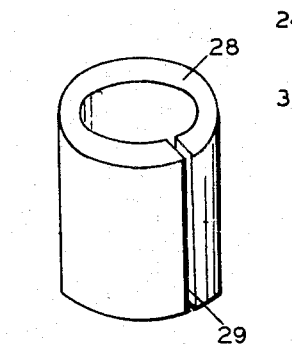
Figure 3 is an enlarged isometric view of the sealing member employed with the invention.
Figure 4:
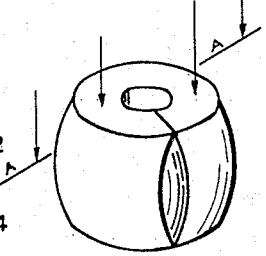
Figure 4 is a further enlarged isometric view of the sealing member as it appears under the influence of the compressive force imposed upon its upper surface.
Figure 5:
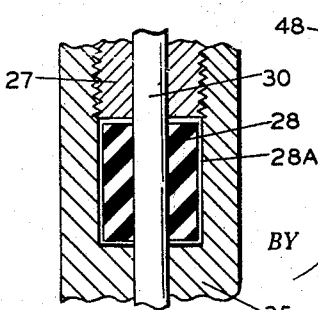
Figure 5 illustrates the relationship of the packer to the stuffing box prior to the advancement of the follower or retainer plug.

It is noted as particularly shown in Figure 5 that the internal diameter of box 28A is somewhat greater than the external diameter of the packer 28 to provide a space. Packer 28, illustrated in enlargement in Figure 3, is composed of any resilient and readily distortable material and is split longitudinally as indicated by reference numeral 29. While vulcanized natural rubber compounds may be employed in some instances, I find that these compounds tend to deteriorate when left under compression for appreciable periods of time in the presence of hydrocarbon fluids. Furthermore, natural rubber will expand. On the other hand, various synthetic rubber compositions, such as Duprene and neoprene, are entirely satisfactory for use in my present invention. Such synthetic rubber members are not noticeably affected by hydrocarbon fluids and are capable of withstanding high pressures and temperatures encountered in oil wells without any apparent loss in resiliency or distortability due to use in my device. When the retainer plug 27 is advanced in stuffing box 28A a compressive force is exerted on the packer 28 causing it to bulge in the middle portion and assume a barrel-like shape as clearly shown in Figures 1 and 4. The inner, upper and lower peripheral edges of the central opening are correspondingly contracted to form line contact with the piston 30 as shown in the drawing. This barreling action is facilitated by the resiliency of the material composing the packing member 28 and the over-size stuffing box 28A. As thus disposed a minimum of frictional resistance is imposed on movement of the piston 30 and, moreover, the effective fluid seal formed at the contact points is proportional to the fluid pressure along the piston imposed on the upper surface of the packer. Extreme accuracy is thereby afforded in recording pressures over a great range in the well bore.

Piston 30 is slidable in passage 26 and carries a collar 31 having a plurality of bleeder ports 32 at its upper end, and a stop 33 at its lower end. A compression spring 34 of any desired strength is contained in the spring chamber concentric to the piston and disposed intermediate collar 31 and plug 25.

Proceeding next to the apparatus illustrated in Figure 2, it will be observed that a plug 35 is threadedly connected to stop 33 and carries the usual type of spring steel stylus 36 having a scriber 37. Plug 35 and stylus 36 project into recording chamber 12 which is formed by the interior of tubular member 38 that is internally threaded at each end to engage plugs 25 and 39, the latter plug being provided with a central fluid duct or passage 40. A pressure recording mechanism 41 is located in tubular member 38 and is positioned between a threaded spacer 42 and a spring 43 which supports the recording mechanism and absorbs any sudden shocks or jars that may be applied to the device. Any continuous pressure recording mechanism of the general type disclosed in United States Patent No. 1,955,855, entitled "Pressure recording device," G. V. D. Marx, inventor, may be successfully employed in my apparatus.

A plug 44 is threadedly connected to plug 39 and is provided with interconnecting ducts 45 and 46. Duct 46 is enlarged and tapped, as indicated at 47 for connection to a suitable source of high pressure fluid supply (not shown) if desired as hereafter explained. A hand-operated valve 48 controls the passage of fluid from duct 46 through connecting ducts 45 and 40, and thence into recording chamber 12. Ducts 40, 45 and 46 may be considered as a single continuous duct whereby the aforementioned fluid under pressure may be transmitted into the recording chamber. A cap 49 for protectively encasing valve 48 is in threaded engagement with the lower end of plug 39.

For the purpose of describing the operation of the present invention, let us assume that compression spring 34 and piston 30 are designed for pressures up to about 5,000 pounds per square inch, and that the maximum pressure that will be encountered in the well bore does not exceed this amount. The device is first assembled with the recording chamber completely sealed off at atmospheric pressure. A wire line (not shown) is inserted through fluid inlet 15 during the assembly operation. The complete mechanism is then lowered into the well bore. Well fluid enters fluid chamber 10 through inlet 15 and passes under apron 22 of closure 21 and thence through ports 20, conductor tube 19 and passage 18 to piston 30. Any solid material that may be entrained with the well fluid settles in the lower portion of the fluid chamber and is prevented from entering passage 18 by conductor tube 19. Fluid admitted to passage 18 is permitted to bleed through ports 32 in collar 31. It will therefore be evident that the effective area exposed to fluid pressure will be the cross section area of piston 30. Longitudinal movement of the piston due to fluid pressure is transmitted to scriber 37 of stylus 36, this movement being recorded upon record-receiving mechanism 41 which preferably rotates at a predetermined constant speed.

My invention is capable of accurately recording well pressures in excess of pressures for which the compression spring 34 has been designed and calibrated. Let us assume that the instrument is designed to record pressures up to 5,000 pounds per square inch when recording chamber is sealed at atmospheric pressure and it is desired to use the device to record pressures in the neighborhood of 8,000 pounds per square inch. An inert gas, such as nitrogen, at a pressure of 3,000 pounds per square inch is introduced into the recording chamber. This is accomplished by removing cap 49 and connecting a supply of nitrogen under the desired pressure to tapped portion 47 of plug 44. Valve 48 is retracted before the inert gas is supplied to my device and is closed after the desired amount of gas is admitted into the recording chamber. Cap 49 is then replaced, as shown in Figure 2. It will be evident to those skilled in the art that the invention is thus capable of recording pressures up to 8,000 pounds per square inch. This arrangement has the advantage of eliminating the necessity of changing pistons and springs in the gauge, and further, reduces stresses in spring 34 at higher pressures.

Figure 6:
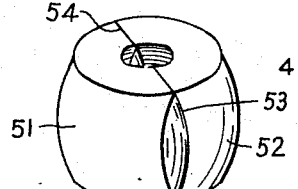
Figure 6 is an enlarged isometric view of a modified form of the sealing member, in which the member is formed in two semicylindrical parts, as they appear under the influence of the compressive force imposed on their upper surfaces.
Figure 4A:
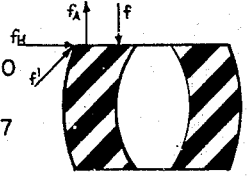
Figure 4A illustrates diagrammatically the relationship of the forces imposed on the distortable packer.

Irrespective of the magnitude of the pressure, a fiber-stress contractional force proportional thereto is generated in the distortable packer 28. The axial split 29 in the present application relieves the "hoop" tension about the central transverse axis A—A, as shown in Figure 4, which allows the packing to "barrel" on compression, form line contact at the top and bottom with the piston 30 and resulting in low friction at the various pressures to which it is subjected. As shown in Figure 4A, the compressive force, $f$, due to follower 27 and the pressure applied along piston 30, produces in the elastic packer a reacting fiber stress $f'$. The geometry of the structures involved resolve $f'$ into force $f_a$ which is equal and opposite to $f$ and a sealing force $f_h$ operates in the horizontal plane around the periphery of the cylindrical packer and maintains the central bore of the packer at the line of contact with member 30 in a perfectly circular seal. Member 30 produces a force of resistance equal and opposite to $f_h$ but not shown. A similar action occurs at the base of the packer. Leakage of fluid past the outer peripheral edge of the packer is prevented by the reacting vertical force $f_a$. In order to obtain the desired distortability, the material of which the packer is composed is chosen for the particular condition of use and pressures to which it is subjected. This may be accomplished, for example, by adjusting the degree of vulcanization to the intended use, the more highly vulcanized the packer, the greater pressures it will withstand. A similar barreling effect and even more efficient seal is obtained when a second longitudinal slit diametrically opposite to the first is provided, dividing the packer into two halves, as shown in Figure 6. The numerals 51 and 52 show the two halves of the packing member with 53 showing a side view of one split when compressed and 54 a top view of the other split.

In order to carry out the objects set forth above of withstanding high pressures while simultaneously creating a minimum frictional resistance to relative movement of shaft 30 in the recording of pressures by scriber 37, it is necessary to so adjust the vulcanization or hardness of the resilient but relatively hard packer 28 so as to obtain the substantially line contact called for in the preceding paragraph. This line contact obtained by the use of a relatively hard packer imposes a minimum of frictional resistance on piston 30, but forms a perfect seal to pressures in the neighborhood of 5,000 pounds per square inch.

From the foregoing, it is believed that the construction, operation and advantages of my present invention will be readily comprehended by persons skilled in the art. It is to be clearly understood, however, that the form of the invention herewith shown and described is to be taken as a preferred example of the same and that various changes in the shape, size and arrangement of parts may be resorted to without departing from the spirit of the invention as defined by the appended claim.

I claim:

In a force measuring device comprising a body having a wall between a first chamber normally at a first pressure and a second chamber normally at a second pressure, the wall having an orifice and a force measuring rod extending into both said chambers and slidable in said orifice, the improvement comprising a stuffing box sealing said rod to said wall with a minimum amount of friction relative to said rod even when said first pressure is greater than said second pressure, a normally substantially cylindrical resilient sleeve packer in the box surrounding the rod, a retainer plug around the rod compressing the packer in the stuffing box, said packer having a substantial wall thickness and a length in excess of three times said wall thickness, said packer being split through the wall thereof for the full length of the packer, the upper and lower inner edges of said packer cylinder closely contacting said rod at all times, said stuffing box being of sufficiently larger diameter than said packer to allow barreling of said packer upon longitudinal compression, said retainer plug longitudinally compressing said packer into a barreled-out shape in said stuffing box and into substantially line contact with the rod at the upper and lower ends of said packer whereby high pressure sealing is effected with a minimum amount of friction even when said first pressure is much greater than said second pressure.

ROBERT C. PRYOR.